Patented Jan. 5, 1926. 1,568,445

UNITED STATES PATENT OFFICE.

CHARLES F. DILLER, OF LANCASTER, PENNSYLVANIA.

PLANT SPRAY.

No Drawing. Application filed January 27, 1925. Serial No. 5,152.

*To all whom it may concern:*

Be it known that I, Charles F. Diller, a citizen of the United States, residing at Lancaster, in the county of Lancaster, State of Pennsylvania, have invented certain new and useful Improvements in Plant Sprays; and I do hereby declare the following to be a full, clear, and exact description of the invention, such as will enable others skilled in the art to which it appertains to make and use the same.

The invention relates to the spraying of plants and includes improvements in the spraying composition itself and in the method of applying the spray.

Plants receive their carbon from the air by absorbing carbon dioxide into the leaves and synthesizing organic compounds by the action of sunlight and the chlorophyll present in the leaves of the plant. The growth of the plant is thus dependent in large measure on the photosynthesis of carbon compounds in the leaves and other green parts of the plant and it is essential to the proper growth and health of the plant that this process should be unimpaired. The synthesis of carbon compounds depends of course on the intensity and duration of the sunlight falling on the leaves and also depends largely on the condition of the sap within the leaves which forms the medium in which synthesis takes place and also depends on the amount of carbon dioxide which is absorbed from the air. This latter absorption takes place through fine ducts in the leaf, the so-called stomata and during the active life of the plant there is a constant pulsation in the leaves which serves the purpose of increasing the absorption of carbon dioxide which is introduced through the stomata. The rate of pulsation varies largely during the day and also with the health of the plant. In general, the absorption is greatest in the early morning of sunny days in summer and in the case of a clear sunny day will usually reach a maximum about 9 a. m.

The efficiency and the rapidity of photosynthesis within the leaf depends in great measure on the liquids and solids which are circulated through the leaf. I have found that there are present in the leaf sap certain granular bodies of microscopic size which I have called chromatin granules. The concentration of chromatin granules in the leaf sap bears a direct and positive relation to the efficiency of the photosynthesis in the leaf and to the health of the plant in general. These granules may be noted by properly sectioning and staining leaves and examining them under the microscope, and I have observed that vigorous healthy plants show a relatively large number of chromatin granules per cubic centimeter, whereas plants of the same species which are not in a healthy condition possess a greatly diminished number of chromatin granules per cubic centimeter. A healthy plant may have as many as 700 chromatin granules to the cubic centimeter of sap whereas the same plant when not in a healthy condition may show as low as one quarter the number of chromatin granules which are present in health.

I do not know just how the chromatin granules affect the efficiency of the photosynthetic and other reactions taking place in the plant leaf and I do not desire to limit my invention by any theoretical explanation of the action of the chromatin granules.

The production of chromatin granules and the effectiveness of the photosynthetic process in the leaf is also greatly aided by the presence of enzymes elaborated by certain of the bacteria which are naturally specific to the plant.

According to the present invention I use a spray which contains bacterial enzymes and chromatin granules in a form capable of ready assimilation by the leaf through the stomata.

I have found that the concentration of enzymes and chromatin granules in the spray varies with different plants and in general depends on the leaf structure. A hard leaf containing a relatively small amount of mesophyll requires and tolerates a stronger concentration of spray than plants having softer leaves and containing relatively larger amounts of mesophyll. For example, tobacco plants require but one half the concentration which may be used with healthy roses. In my investigations, I have found that the rough inverse proportionality between mesophyll and concentration of spray holds good over a large number of plants.

The concentration of spray which may be used is also dependent on the health of the plant to be treated and appears to be roughly proportional to the concentration of chromatin granules. For example, a sick rose plant can tolerate not more than one half the concentration which could be used with the same plant when in a healthy condition.

A further object of the invention is to prepare a powder containing enzymes and chromatin granules in a form which keeps readily and can be easily incorporated with sprays. It is a further advantage of the present invention that the enzyme and chromatin granule powder can be employed with most of the common insecticidal sprays such as Bordeaux mixture, lead arsenate and the like and it can be effectively combined with the insecticidal treatment.

According to my invention I select leaves or seeds of plants which by their vigorous and healthy growth, chlorophyll content and microscopic structure show themselves to be in a healthy and vigorous state and contain a maximum number of chromatin granules which should be close to the figure of 700 per cubic centimeter for healthy plants. The leaves are then introduced into an incubating medium and incubated to produce a vigorous vegetation of the bacteria and a correspondingly copious production of enzymes. Any of the ordinary incubating media may be used but I prefer to incubate in an inorganic medium as described in my prior Patent No. 1,254,808, October 5, 1920. When the bacteria are in their best state of vegetation, which can be determined by observing a drop of the culture under a microscope, the maximum amount of enzymes are produced and I may separate the enzymes from the culture by any of the well-known methods, such as for example, by precipitation with alcohol. I take about 1250 cc. of liquid enzymes and chromatin granules and absorb in a dried and pulverized inorganic solid, such as for example, silica, potassium silicate, calcium carbonate, phosphate rock or the like and the product is then dried. I prefer to use an amount of inorganic solid so that the finished product weighs about 5000 grams after being dried. While I have found that the above proportions yield a very satisfactory and effective product, it should be understood that my invention is not limited to the specific proportions which may be varied without departing from the spirit of the invention.

The pulverized dry powder, which should preferably be about 200 mesh, will keep almost indefinitely as the enzymes and chromatin granules are relatively insensitive in their dried state. The powder is always ready for mixture with water or a spray and may be put out in unit packages to facilitate the preparation of sprays of definite concentration by the user.

To prepare the spray for use the fine powder is evenly suspended in water or an insecticidal spray, such as for example, Bordeaux mixture, lead arsenate or the like and the spray is then applied to the plant, care being taken to adjust the concentration of enzyme and chromatin granule powder in the spray to the character of the plant and their condition of health. I have found that in general healthy tobacco plants require a spray containing about 4 ounces of the enzyme powder to 50 gallons of spray. Roses usually take about double the amount or 8 ounces to 50 gallons. However, when the plants are sickly, the concentration should be considerably reduced. For example, roses which are sickly, should be first sprayed with about half concentration used for healthy plants, that is to say about 4 ounces per 50 gallons. As the roses become more healthy which may be determined by noting the red shoots of new growth or by examining a section of leaf under a microscope to determine the number of chromatin granules per cc., the spray can be increased in concentration.

I have found that it is advantageous to use the sprays in quantities of about 100 gallons per acre spread of plants although these figures may be varied somewhat.

If it is desired to cause a greater amount of spray than 100 gallons per acre to stick to the leaves of the plant, any of the usual materials employed to increase the adhesiveness of the spray, such as glue, molasses, calcium sulfate and the like may be added to the spray of the present invention without affecting its efficiency.

The effectiveness of the spray is greatest at periods when the activity of the stomata and pulsation in the plant are at their maximum. I have therefore found it desirable to spray the plant in the morning of clear sunshiny days. It should be understood that the spray can be applied at any time during the day though with decreased effectiveness.

The effects of the spray of the present invention have proven very beneficial in use with a large number of different plants and a considerable increase in growth as well as health and resistance to disease of the plant may be noted. The noticeable effects of the spray consist in an increase in greenness of the leaves and increased growth of new shoots as well as an increase in the concentration of chromatin granules present in the sap of the plant. The treatment of the present invention may also efficaciously be employed in treating plants which are sickly and the results in improved plant health and increase in growth are notable. The concentration of spray used should, however, be regulated so as to avoid the use of too concentrated sprays on the sickly plant. For example, I have found that the roses which are sickly and show practically no new growth when treated with a spray containing about 4 ounces of enzyme and chromatin granule powder to the 50 gallons show a rapid improvement and in about ten days or two weeks the increase in chromatin granules is about 400% and the plants show red shoots and increasingly green leaves indicative of healthy plants. Stronger sprays can then be used with a corresponding increase in effectiveness.

The invention has been described in connection with specific figures as to amounts and concentrations, but it should be understood that these figures are illustrative merely and that the invention is not limited to the specific proportions set forth, as naturally the concentration of the spray varies with the plants and also the amount used per acre depends to a considerable extent on the physical characteristics of the plant.

In the claims the expression "plant bacterial enzyme" is used to cover enzymes elaborated by the bacteria which are specific to the plant.

I claim:

1. A plant spray comprising a suspension of dried plant bacterial enzyme and chromatin granule products in a liquid medium.

2. A plant spray comprising a suspension of dried plant bacterial enzyme and chromatin granule products in an insecticidal spray.

3. A plant spray comprising a suspension of about 4 to 8 ounces of dry plant bacterial enzyme and chromatin granule products in 50 gallons of a liquid medium.

4. A plant spray comprising a suspension of about 4 to 8 ounces of dry plant bacterial enzyme and chromatin granule products in 50 gallons of an insecticidal spray.

5. As a new product a dry powder consisting in dried plant bacterial enzyme and chromatin granules associated with a pulverent solid.

6. The method of preparing a bacterial enzyme chromatin granule product which comprises selecting plant bacteria and chromatin granules, incubating to the point of maximum vegetation, separating the enzymes and chromatin granules, absorbing the resultant product in a dry pulverized solid, and drying the product.

7. The method of preparing a bacterial enzyme chromatin granule product which comprises selecting plant bacteria and chromatin granules, incubating in an inorganic medium to the point of maximum vegetation, separating the enzymes and chromatin granules, absorbing the resultant product in a dry pulverized solid, and drying the product.

8. The method of preparing a bacterial enzyme and chromatin granule product which comprises selecting plant bacteria and chromatin granules, incubating to the point of maximum vegetation, separating the enzymes and chromatin granules, and absorbing about 1250 cc. in and drying with sufficient pulverized solids to yield 5000 grams of a dry product.

9. The method of preparing a bacterial enzyme and chromatin granule product which comprises selecting plant bacteria and chromatin granules, incubating in an inorganic medium to the point of maximum vegetation, separating the enzymes and chromatin granules, and absorbing about 1250 cc. in and drying with sufficient pulverized solids to yield 5000 grams of a dry product.

10. The process of treating plants which comprises spraying the plants at a period of maximum stomata activity with a spray containing a dried plant bacterial enzyme and chromatin granule product.

11. The process of treating plants which comprises spraying the plants with a spray containing a dried plant bacterial enzyme and chromatin granule product, the concentration of the product in the spray being adjusted in accordance with the chromatin granule concentration in the plant.

12. The process of treating plants which comprises spraying the plants at a period of maximum stomata activity with a spray containing a dried plant bacterial enzyme and chromatin granule product, the amount of the spray corresponding to 100 gallons per acre.

In testimony whereof I affix my signature.

CHARLES F. DILLER.